(12) United States Patent
Kato

(10) Patent No.: US 11,415,221 B2
(45) Date of Patent: Aug. 16, 2022

(54) DAMPER DEVICE

(71) Applicant: PIOLAX, INC., Yokohama (JP)

(72) Inventor: Kouichi Kato, Yokohama (JP)

(73) Assignee: PIOLAX, INC., Yokohama (JP)

( * ) Notice: Subject to any disclaimer, the term of this patent is extended or adjusted under 35 U.S.C. 154(b) by 513 days.

(21) Appl. No.: 16/496,988

(22) PCT Filed: Mar. 23, 2018

(86) PCT No.: PCT/JP2018/011843
§ 371 (c)(1),
(2) Date: Sep. 24, 2019

(87) PCT Pub. No.: WO2018/181043
PCT Pub. Date: Oct. 4, 2018

(65) Prior Publication Data
US 2020/0103026 A1   Apr. 2, 2020

(30) Foreign Application Priority Data

Mar. 30, 2017   (JP) .............................. JP2017-068667

(51) Int. Cl.
*F16J 1/18*   (2006.01)
*F16F 9/50*   (2006.01)
*F16F 9/54*   (2006.01)

(52) U.S. Cl.
CPC .. *F16J 1/18* (2013.01); *F16F 9/54* (2013.01)

(58) Field of Classification Search
CPC ...... F16F 15/161; F16F 15/1238; F16F 9/063; F16F 9/3221; F16F 9/50; F16F 9/54
See application file for complete search history.

(56) References Cited

U.S. PATENT DOCUMENTS 4,630,958 A  *  12/1986  McCallister ............... F16J 1/12
                                                        403/DIG. 7
4,917,003 A  *   4/1990  Kollross ................. F16B 21/12
                                                        92/216

(Continued)

FOREIGN PATENT DOCUMENTS

JP     UM 2577892 Y2    8/1998
JP     2013-249963 A   12/2013

OTHER PUBLICATIONS

International Search Reprot (ISR) (PCT Form PCT/ISA/210), in PCT/JP2018/011843, dated May 15, 2018 (English and Japanese versions).

(Continued)

*Primary Examiner* — Long T Tran
(74) *Attorney, Agent, or Firm* — McGinn IP Law Group, PLLC

(57) ABSTRACT

A damper device includes a cylinder including an attachment portion and a piston including an attachment portion. The attachment portion of at least one of the cylinder and the piston includes an elastic portion which urges a pin member inserted therein in an axial direction and a radial direction. The elastic portion includes an axial abutment portion which abuts on a large-diameter portion of the pin member protruding radially outward from an outer peripheral surface of the pin member; and a radial abutment portion which abuts on the outer peripheral surface of the pin member.

5 Claims, 9 Drawing Sheets

(56) References Cited

U.S. PATENT DOCUMENTS

| | | | | |
|---|---|---|---|---|
| 5,111,917 | A * | 5/1992 | Rotharmel | F16F 9/44 |
| | | | | 188/300 |
| 5,735,373 | A | 4/1998 | Klein et al. | |
| 5,833,036 | A * | 11/1998 | Gillespie | F16F 1/042 |
| | | | | 188/315 |
| 6,412,393 | B1 | 7/2002 | Heitz | |
| 6,666,784 | B1 * | 12/2003 | Iwamoto | F01L 9/20 |
| | | | | 137/554 |
| 9,097,272 | B2 * | 8/2015 | Van Niekerk | F16B 21/04 |
| 2006/0054436 | A1 * | 3/2006 | Handke | B60G 15/067 |
| | | | | 188/321.11 |
| 2006/0083586 | A1 * | 4/2006 | Fuller | B60G 13/003 |
| | | | | 403/408.1 |
| 2006/0275073 | A1 * | 12/2006 | Reszka | F16B 5/0685 |
| | | | | 403/243 |
| 2009/0079215 | A1 * | 3/2009 | Shirase | E05F 1/10 |
| | | | | 49/386 |
| 2010/0026030 | A1 * | 2/2010 | Kim | B60R 7/06 |
| | | | | 296/37.12 |
| 2019/0040663 | A1 * | 2/2019 | Ruzich | B60R 7/04 |

OTHER PUBLICATIONS

Written Opinion of the International Searching Authority (PCT/ISA/237), in PCT/JP2018/011843, dated May 15, 2018 (Japanese version).
(PCT/IPEA/409), in PCT/JP2018/011843 (Japanese version) International Preliminary Report on Patentability (PCT/IPEA/409), in PCT/JP2018/011843, dated Feb. 14, 2019.

* cited by examiner

DAMPER DEVICE

TECHNICAL FIELD

The present invention relates to a damper device including an attachment portion through which a pin member is inserted.

BACKGROUND ART

Patent Literature 1 discloses a piston damper including a cylindrical cylinder, a piston arranged so as to be reciprocally movable in the cylinder, a rod moving together with the piston, and a cap attached to one end side of the cylinder. An attachment portion protruding from an outer peripheral wall of the cylinder includes a fitting hole and an elastic piece portion formed along an inner peripheral surface of the fitting hole. The elastic piece portion can be deformed in a radial direction by a slit.

CITATION LIST

Patent Literature

Patent Literature 1: JP-A-2013-249963

SUMMARY OF INVENTION

Technical Problem

A pin member provided to a fixed body or an opening and closing body is inserted and attached to the attachment portion. In a case where the position of the pin member is deviated due to a manufacturing error of the fixed body or the opening and closing body, rattling may occur between the attachment portion and the pin member. In the attachment portion of the piston damper disclosed in Patent Literature 1, it is possible to suppress rattling in the radial direction by the elastic piece portion in an attached state in which the pin member is inserted into the fitting hole of the attachment portion, but the rattling in an axial direction is not suppressed.

The present invention has been made in view of such a problem, and an object thereof is to provide a damper device that suppresses rattling in an axial direction and a radial direction with respect to a pin member inserted into an attachment portion.

Solution to Problem

In order to solve the above problem, according to an aspect of the present invention, there is provided a damper device which applies a damping force to the action of opening and closing an opening and closing body provided to a fixed body. The damper device includes a cylinder and a piston which is capable of advancing and retracting in the cylinder. The cylinder includes an attachment portion which is pivotally supported on a pin member provided to one of a fixed body and an opening and closing body, and the attachment portion includes an opening portion which penetrates in a direction substantially orthogonal to an advancing and retracting direction of the piston. The piston includes an attachment portion which is pivotally supported on a pin member provided to another of the fixed body or the opening and closing body, and the attachment portion includes an opening portion which penetrates in the direction substantially orthogonal to the advancing and retracting direction of the piston. The attachment portion of at least one of the cylinder and the piston includes an elastic portion which urges the inserted pin member in an axial direction and a radial direction. The elastic portion includes an axial abutment portion which abuts on a large-diameter portion of the pin member protruding radially outward from an outer peripheral surface of the pin member, and a radial abutment portion which abuts on the outer peripheral surface of the pin member.

Advantageous Effects of Invention

According to the present invention, it is possible to provide the damper device that suppresses rattling in the axial direction and the radial direction with respect to the pin member inserted into the attachment portion.

DESCRIPTION OF EMBODIMENTS

Figure 1:
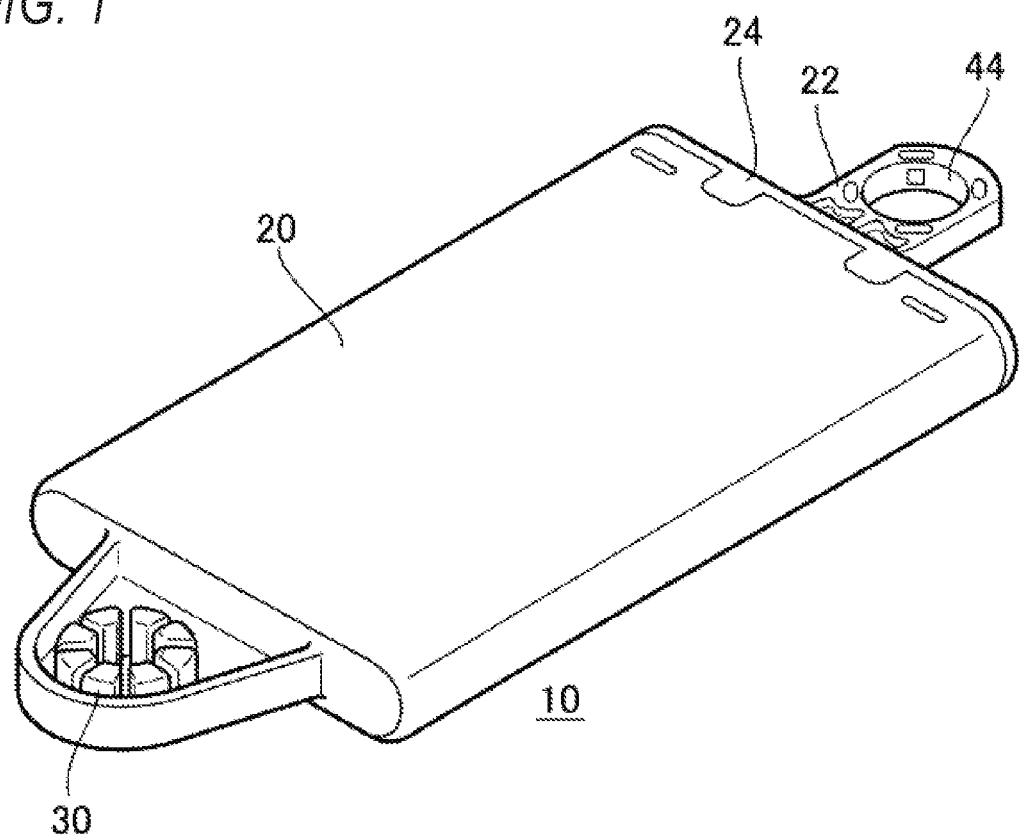
FIG. 1 is a perspective view of a damper device according to a first embodiment.
Figure 2:
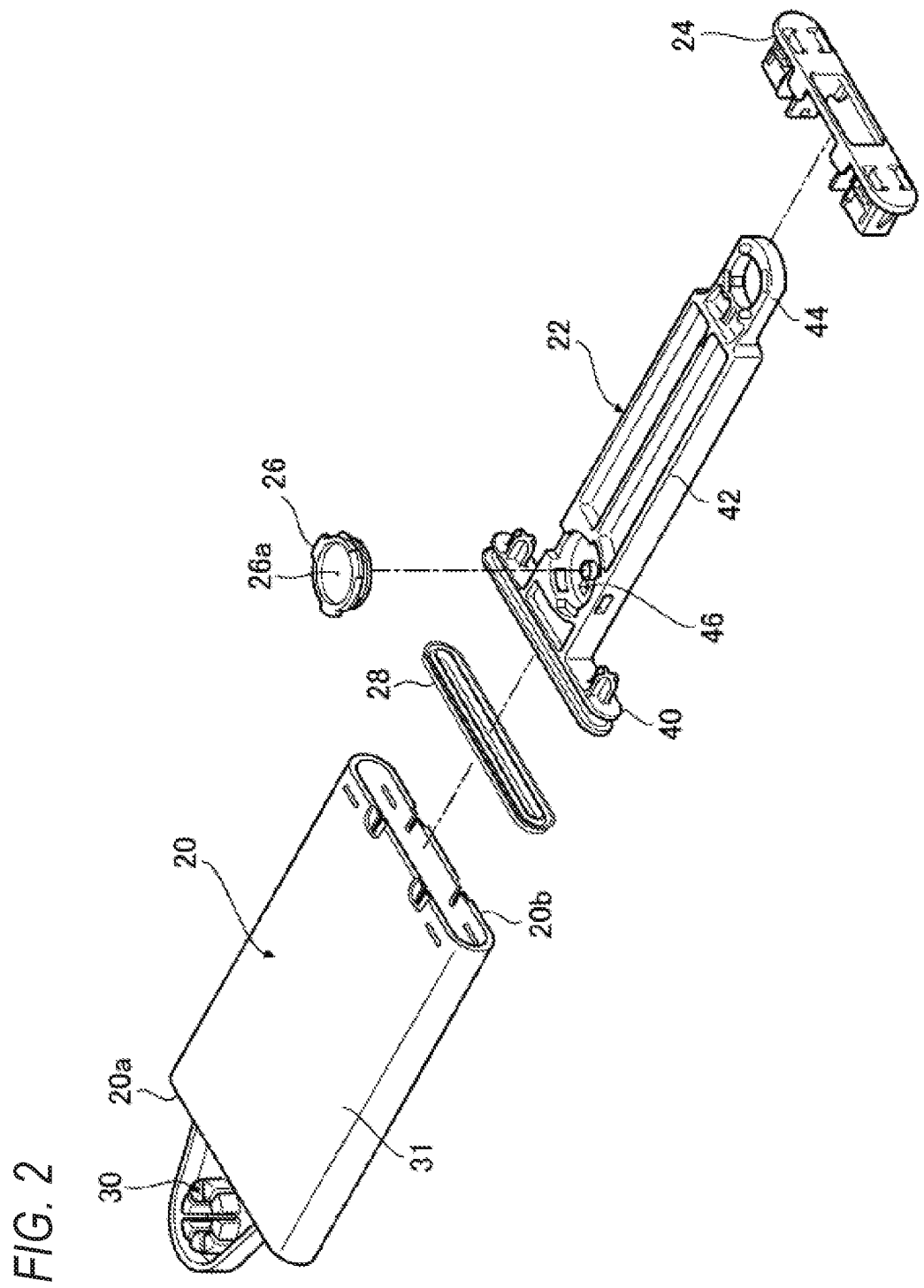
FIG. 2 is an exploded view of the damper device according to the first embodiment.

FIG. 1 is a perspective view of a damper device 10 according to a first embodiment. FIG. 2 is an exploded view of the damper device 10 according to the first embodiment. The damper device 10 is attached to, for example, a glove box of a vehicle, and applies a damping force to the operation of opening and closing an opening and closing body (lid member) of the glove box. The damper device 10 may be attached to a console box of the vehicle and apply a damping force to the opening and closing of an opening and closing body of the console box. In either case, the damper device 10 is attached to a box-shaped fixed body and an opening and closing body that opens and closes the opening of the box-shaped fixed body.

The damper device 10 includes a cylinder 20, a piston 22, a cap 24, an orifice forming member 26, and a seal ring 28. The cylinder 20 includes a cylindrical cylinder body 31 and a first attachment portion 30. The cylinder body 31 is formed in a thin shape having a parallel surface and can be arranged in a narrow space. One end of the cylinder body 31 has a bottom portion 20a, and the other end thereof has an opening portion 20b.

The first attachment portion 30 is provided on the bottom portion 20a of the cylinder body 31, and is axially supported on one of the fixed body and the opening and closing body. Details of the first attachment portion 30 will be described later. The first attachment portion 30 and a second attachment portion 44 are disposed coaxially in an advancing and retracting direction of the piston 22 such that rotational torque is less likely to be input to the damper device 10.

The piston 22 includes a piston body 40, a rod 42, the second attachment portion 44, and a communication hole 46. The piston body 40 divides a housing space of the cylinder body 31 into a first chamber and a second chamber, and is capable of advancing and retracting within the cylinder body 31. The seal ring 28 made of a rubber material is provided on an outer periphery of the piston body 40.

The rod 42 is erected from the piston body 40, and is formed with the second attachment portion 44 at a tip end. The second attachment portion 44 has an opening and is pivotally supported by inserting a pin member provided to the other one of the fixed body and the opening and closing body. The communication hole 46 is formed from the piston body 40 to the rod 42, and communicates the first chamber and the second chamber which are divided by the piston body 40.

The orifice forming member 26 is formed in a disk shape and includes an orifice hole 26a and is fitted to the rod 42. The orifice hole 26a functions as an orifice by reducing the communication hole 46. By providing the orifice forming member 26 on the rod 42 instead of the piston body 40, the thickness of the cylinder 20 can be reduced.

The cap 24 closes the opening portion 20b of the cylinder 20 and is locked to the cylinder 20. The cap 24 has a hole part through which the rod 42 is inserted.

In the damper device 10, for example, the cylinder 20 is fixed to a glove box body (fixed body), and the piston 22 is connected to the opening and closing body of the glove box. The piston 22 advances and retracts within the cylinder 20 in response to opening and closing of the opening and closing body. The first chamber on a bottom portion 20a side of the cylinder 20 generates a negative pressure when the piston 22 advances toward the opening portion 20b side, resulting in a damping force. That is, when the opening and closing body is opened, the piston 22 and the seal ring 28 are pulled toward the opening portion 20b side, and the opening speed of the opening and closing body can be reduced by the negative pressure of the first chamber.

Figure 3:
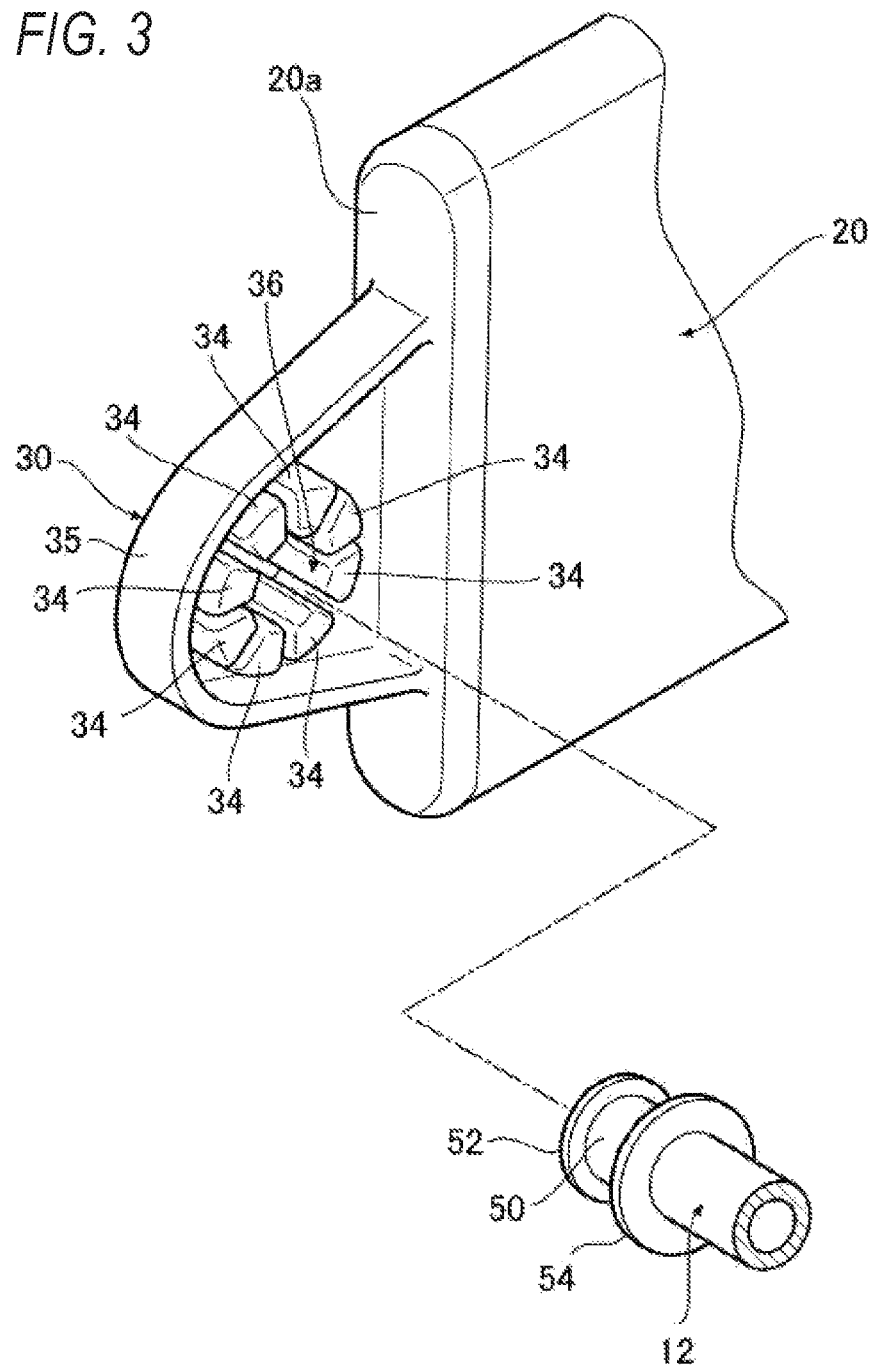
FIG. 3 is a diagram for explaining attachment of a pin member to a first attachment portion.

FIG. 3 is a diagram for explaining attachment of a pin member 12 to the first attachment portion 30. An opening portion 36 of the first attachment portion 30 penetrates in a direction substantially orthogonal to the advancing and retracting direction of the piston 22 as shown in FIG. 1, and the pin member 12 provided to the fixed body and the opening and closing body is inserted in the direction substantially orthogonal to the advancing and retracting direction of the piston 22 and is input to the damper device 10. The pin member is inserted through the second attachment portion 44 similarly to the first attachment portion 30. In order to suppress rattling between the pin member 12 and the attachment portion of the damper device 10, elastic portions 34 are provided in the first attachment portion 30. By suppressing the rattling with the pin member 12, the response delay of the damper device 10 with respect to the input from the pin member 12 to the damper device 10 is suppressed.

Although an aspect in which the elastic portions 34 are provided in the first attachment portion 30 is shown in the first embodiment, the present invention is not limited to this aspect, and the elastic portions 34 may be provided in the second attachment portion 44. The elastic portions 34 are provided in at least one of the first attachment portion 30 and the second attachment portion 44.

The pin member 12 includes a first large-diameter portion 52 and a second large-diameter portion 54 protruding radially outward from an outer peripheral surface of a columnar shaft portion 50. The first large-diameter portion 52 is located at a tip end of the pin member 12 and is formed in a tapered shape for easy insertion. The second large-diameter portion 54 faces the first large-diameter portion 52 at a predetermined interval. The second large-diameter portion 54 protrudes perpendicularly from the outer peripheral surface and functions as a stopper for stopping insertion of the pin member 12. The pin member 12 can be inserted and attached to the opening portion 36 of the first attachment portion 30 from both a front surface side and a back surface side.

Figure 4:
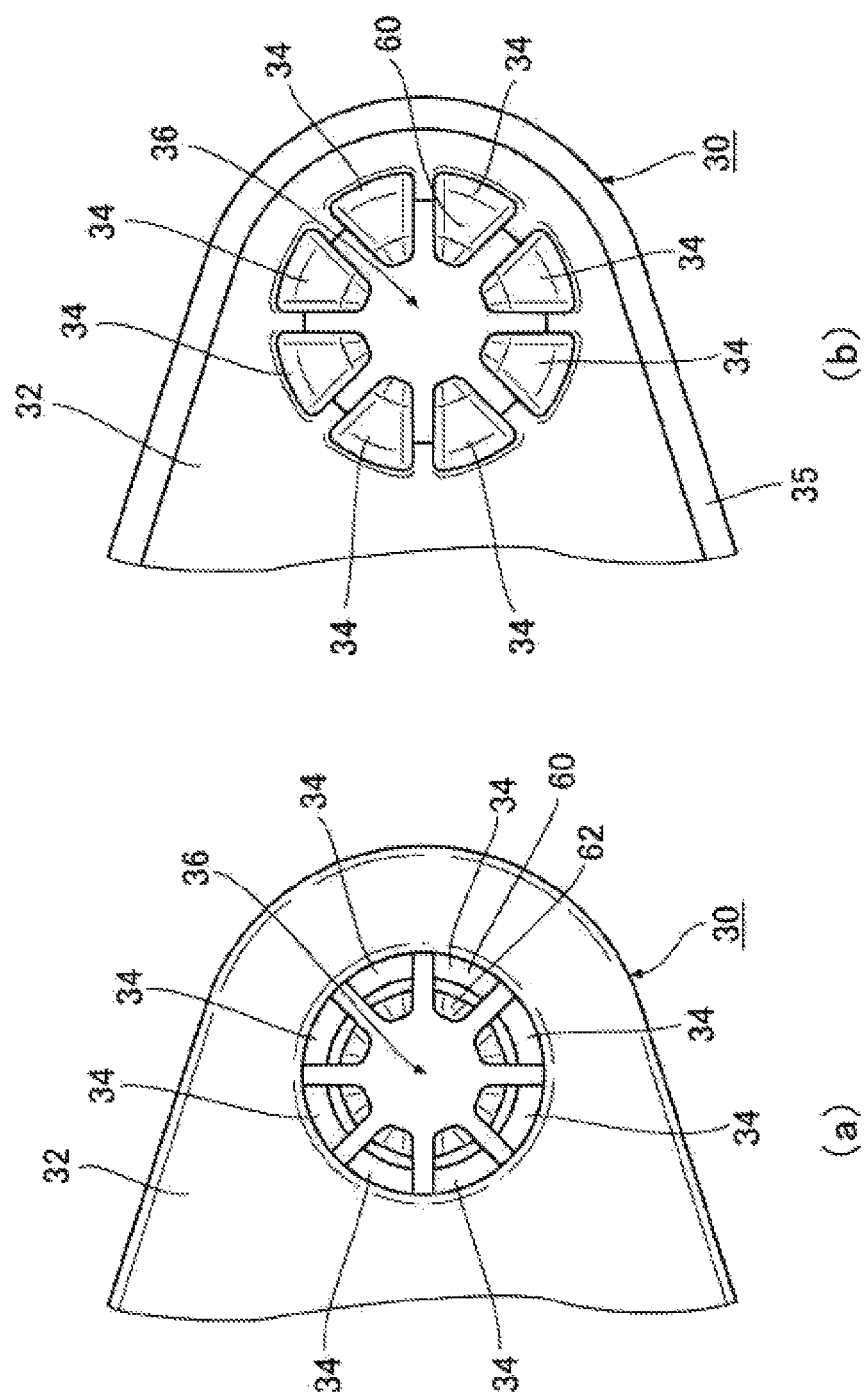
FIG. 4 is a diagram for explaining the first attachment portion.
Figure 5:
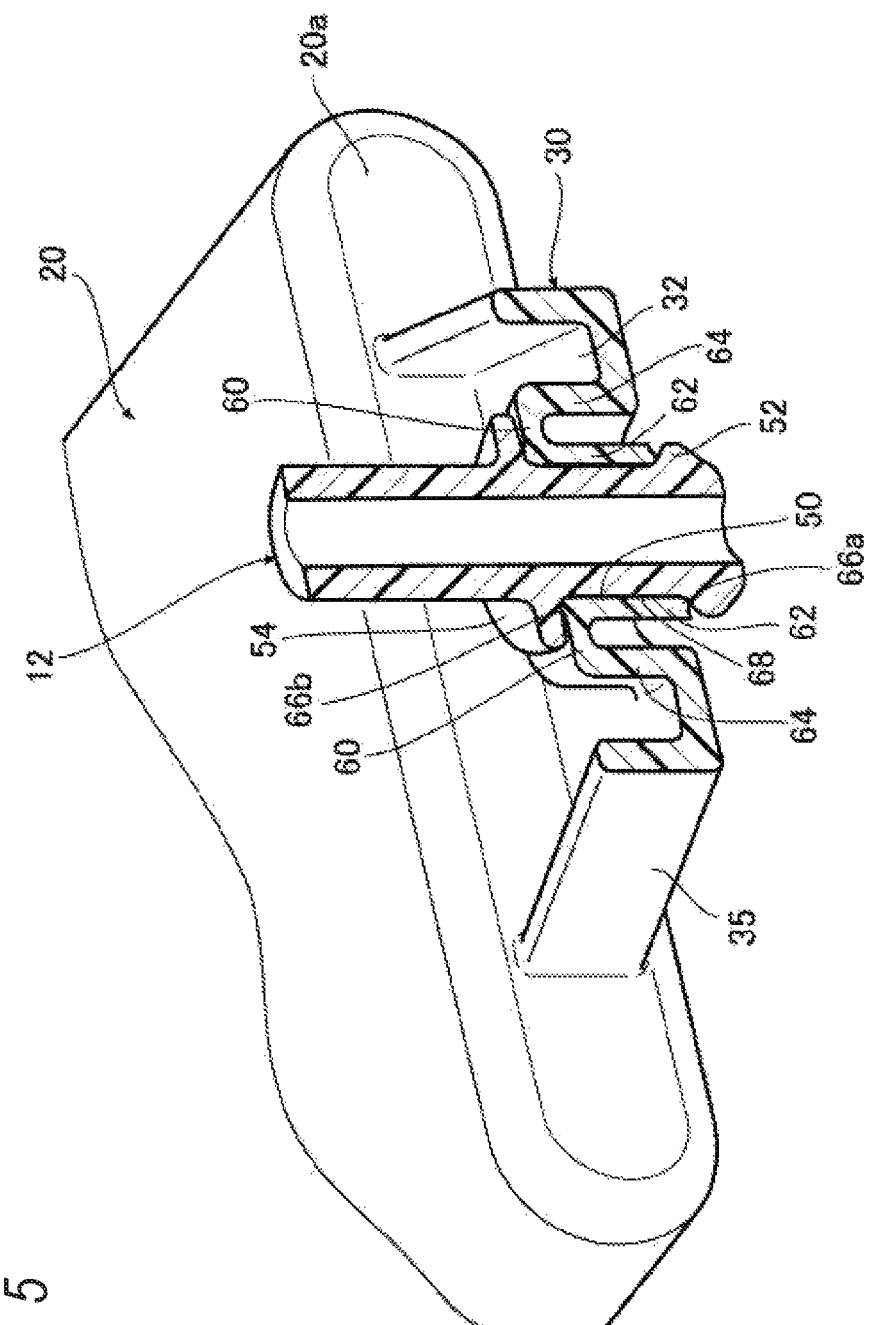
FIG. 5 is a sectional view of a state in which the pin member is attached to the first attachment portion.

FIG. 4 is a diagram for explaining the first attachment portion 30. FIG. 4(a) is a front view of the first attachment portion 30, and FIG. 4(b) is a back view of the first attachment portion 30. FIG. 5 is a sectional view of a state in which the pin member 12 is attached to the first attachment portion 30.

The first attachment portion 30 includes a plate-shaped base portion 32, the plurality of elastic portions 34 formed at the edges of the opening portion 36, and a wall portion 35 protecting the elastic portion 34. The plurality of elastic portions 34 are formed to protrude from the edges of the circular opening portion 36 toward the central axis, and are arranged in the circumferential direction. Here, a direction along the central axis of the opening portion 36 is simply referred to as the axial direction, and a direction orthogonal to the central axis of the opening portion 36 is simply referred to as the radial direction.

As shown in FIG. 5, the elastic portion 34 includes a first extension portion 60, a second extension portion 62, and a third extension portion 64. The first extension portion 60 extends in the radial direction, and the second extension portion 62 and the third extension portion 64 extend in a direction crossing the radial direction and face each other. The third extension portion 64 extends in the substantially axial direction from the base portion 32, the first extension portion 60 extends in the radial direction by being bent from one end of the third extension portion 64, and the second extension portion 62 is bent from one end of the first extension portion 60 and extends in the direction intersecting the radial direction. The elastic portion 34 is bent in two steps at both ends of the first extension portion 60 and is configured to be easily bent.

The second extension portion 62 extends from one end of the first extension portion 60, and the third extension portion 64 extends from the other end of the first extension portion 60. In order to urging the pin member 12 in an attached state, the first extension portion 60 and the third extension portion 64 are slightly inclined with respect to the axial direction and extend in a direction intersecting with the radial direction. The second extension portion 62 is inclined so as to approach the central axis toward a tip end of the second extension portion 62.

The second extension portion 62 includes a first axial abutment portion 66a and a second axial abutment portion 66b at both ends thereof (hereinafter, referred to as "axial abutment portions 66" when they are not distinguished). In the attached state of the pin member 12, the second extension portion fits between the first large-diameter portion 52 and the second large-diameter portion 54, and the first axial abutment portion 66a abuts on the first large-diameter portion 52 and the second axial contact portion 66b abuts on the second large-diameter portion 54. The radial abutment portion 68 abuts on an outer peripheral surface of the pin member 12. Accordingly, the elastic portion 34 can urge the pin member 12 in the axial direction and the radial direction to suppress rattling in two different directions in one configuration.

Figure 6:
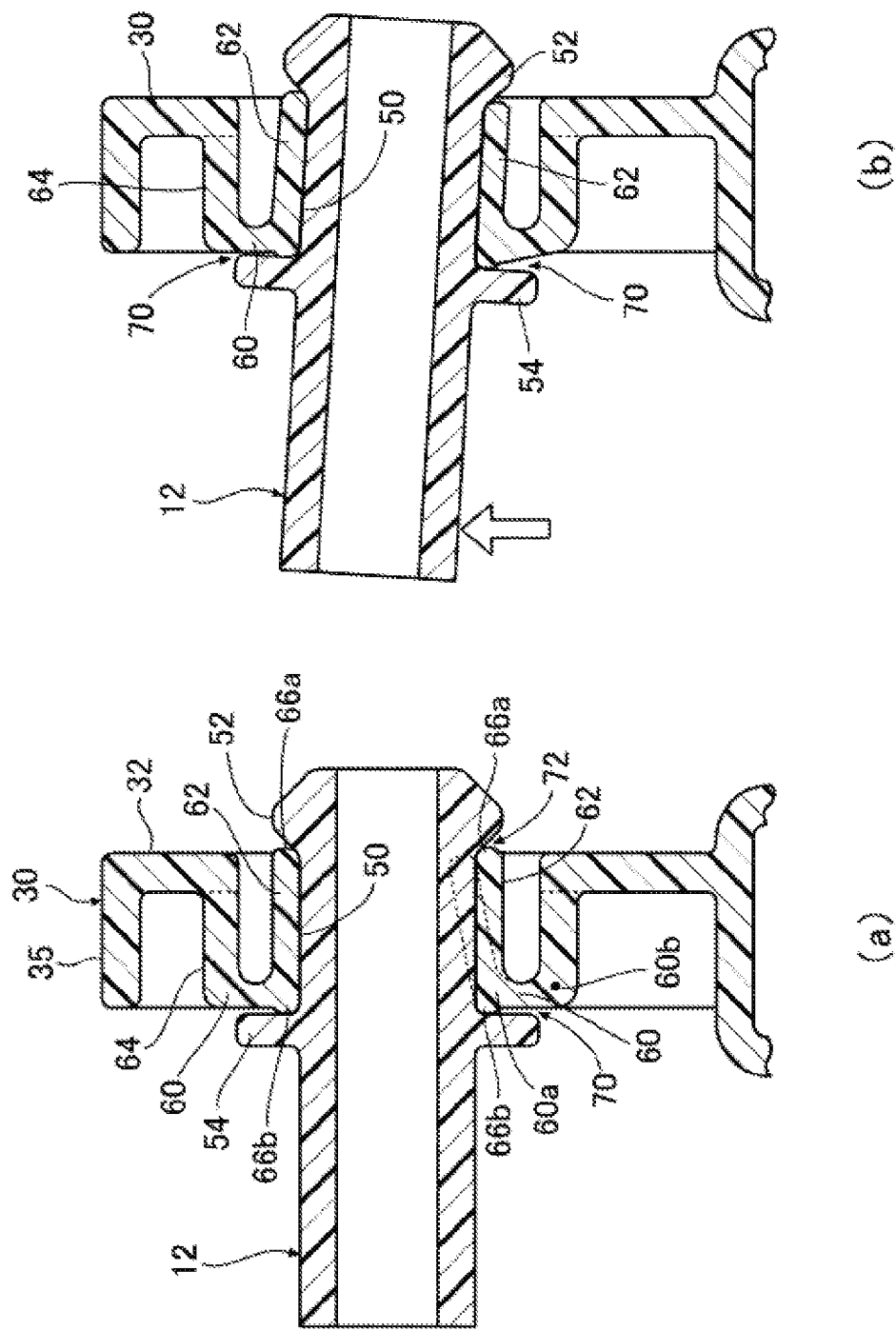
FIG. 6 is a view for explaining an operation of an elastic portion of the first attachment portion.

FIG. 6 is a view for explaining an operation of the elastic portion 34 of the first attachment portion 30. FIG. 6(a) shows a state in which the pin member 12 is not inclined with respect to the central axis direction of the opening portion 36, and FIG. 6(b) shows a state in which the pin member 12 is inclined with respect to the central axis direction of the opening portion 36. Further, FIGS. 6(a) and 6(b) show a state in which the pin member 12 is inserted into the opening portion 36 from the back side.

The second extension portion 62 indicated by a broken line in FIG. 6(a) is in a free state before the pin member 12 is attached, and is inclined such that the tip end thereof approaches the central axis of the opening portion 36. Accordingly, the elastic portion 34 urges the shaft portion 50 of the pin member 12 in the radial direction to suppress rattling with the pin member 12 in the radial direction.

The first axial abutment portion 66a and the second axial abutment portion 66b at both ends of the second extension portion 62 abut on the first large-diameter portion 52 and the second large-diameter portion 54, respectively. For example, when the pin member 12 advances in a direction in which the pin member 12 is inserted (right direction in FIG. 6(b)), the second large-diameter portion 54 pushes the second axial abutment portion 66b of the second extension portion 62. At this time, the first extension portion 60 rotates such that one end 60a thereof is displaced in the direction in which the pin member 12 is inserted, thereby urging the second large-diameter portion 54 of the pin member 12 in the axial direction. That is, when the first extension portion 60 rotates with a bent portion 60b of the third extension portion 64 as a rotation fulcrum, an urging force to the pin member 12 is generated. Accordingly, the elastic portion 34 urges the second large-diameter portion 54 of the pin member 12 in the axial direction to suppress rattling with the pin member 12 in the axial direction.

As shown in FIG. 6(a), the second axial abutment portion 66b of the second extension portion 62 protrudes in the axial direction from the first extension portion 60, and a gap 70 is formed between the first extension portion 60 and the second large-diameter portion 54 in a normal state in which the pin member 12 is not inclined. The second large-diameter portion 54 overlaps the first extension portion 60 as viewed in the axial direction and faces the first extension portion 60 with the gap 70 therebetween. Accordingly, when the pin member 12 is inclined with respect to the central axis of the opening portion 36, a space in which the second large-diameter portion 54 moves is secured, a load applied to the elastic portion 34 is suppressed, and the durability can be improved.

A tip end of the first axial abutment portion 66a protrudes from the base portion 32 in the axial direction. Accordingly, when the pin member 12 is inserted in a direction opposite to that shown in FIG. 6(a), the pin member 12 is inclined and interference of the second large-diameter portion 54 with the base portion 32 can be suppressed. That is, the attachment direction of the damper device 10 is not limited.

As shown in FIG. 6(b), when the pin member 12 is inclined, the second large-diameter portion 54 approaches the first extension portion 60 so as to narrow the gap 70. At this time, the third extension portion 64 rotates with the base end as the rotation fulcrum, and acts so as to maintain abutment between the second extension portion 62 and the shaft portion 50. The second extension portion 62 can maintain the state in which the pin member 12 is urged following the inclination of the shaft portion 50 by the rotation of the third extension portion 64 and suppress rattling with the pin member 12.

Figure 7:
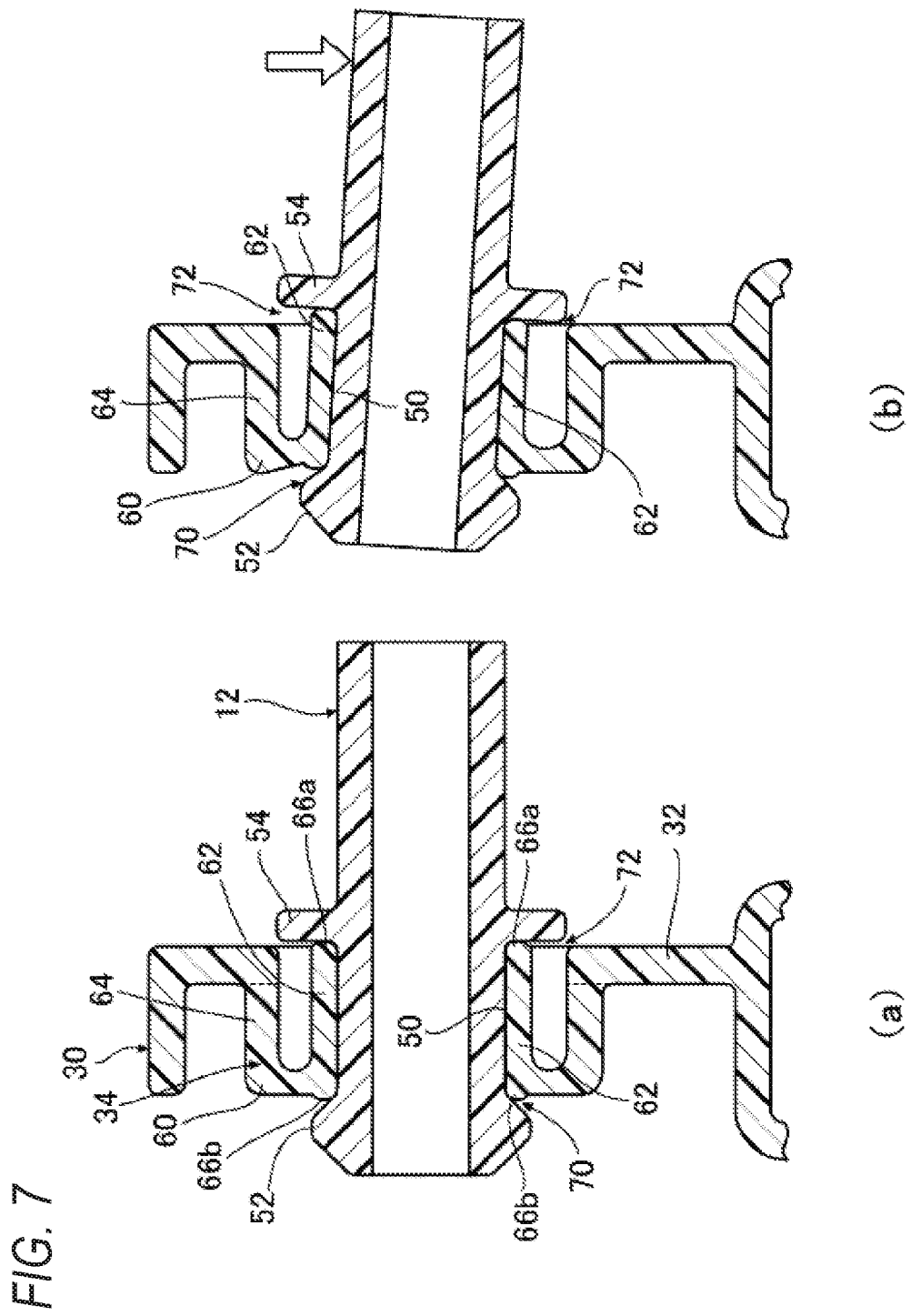
FIG. 7 is a sectional view of the first attachment portion in a state in which the pin member is inserted into an opening portion from a front side.

FIG. 7 is a sectional view of the first attachment portion 30 in a state in which the pin member 12 is inserted into the opening portion 36 from a front side. FIG. 7(a) shows a state in which the pin member 12 is not inclined with respect to the central axis direction of the opening portion 36, and FIG. 7(b) shows a state in which the pin member 12 is inclined with respect to the central axis direction of the opening portion 36.

In the first attachment portion 30 shown in FIG. 7(a), the insertion direction of the pin member 12 is opposite to that of the first attachment portion 30 shown in FIG. 6(a). No matter the pin member 12 is inserted from the front side or the back side of the first attachment portion 30, the first large-diameter portion 52 of the pin member 12 is received in the opening portion 36 by inclining the second extension portion 62 and the third extension portion 64 so as to expand respectively. Since the elastic portion 34 includes not only the second extension portion 62 but also the third extension portion 64, the followability in the radial direction is improved, and the pin member 12 can be inserted from both directions of the first attachment portion 30.

As shown in FIG. 7(b), when the pin member 12 is inclined, the second large-diameter portion 54 approaches a base end side of third extension portion 64 so as to narrow a gap 72. At this time, the third extension portion 64 and the second extension portion 62 are inclined to follow the pin member 12 to maintain abutment between the second extension portion 62 and the shaft portion 50, thereby suppressing rattling with the pin member 12.

Figure 8:
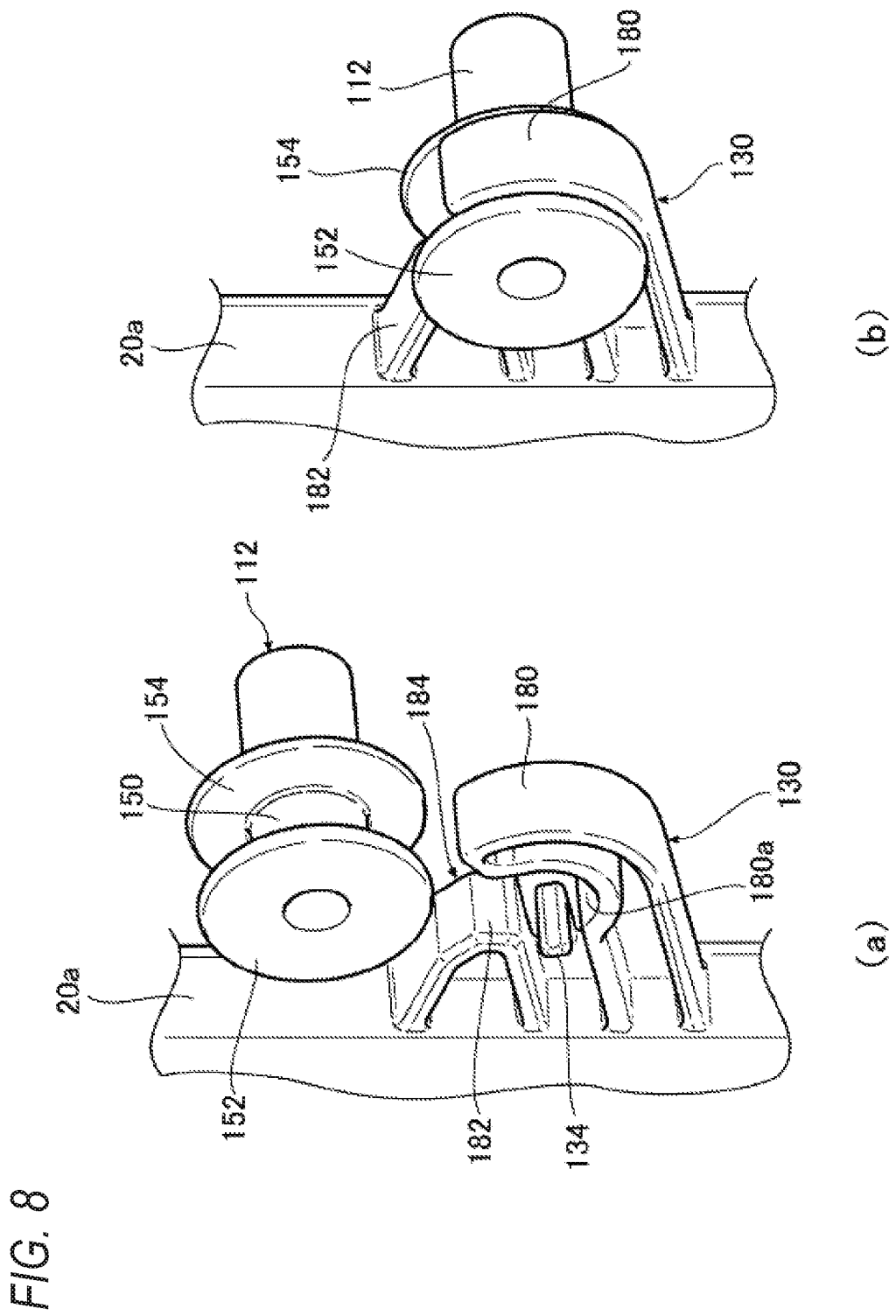
FIG. 8 is a diagram for explaining an attachment portion of a damper device according to a second embodiment.

FIG. 8 is a diagram for explaining an attachment portion 130 of the damper device 10 according to a second embodiment. The attachment portion 130 of the first embodiment shown in FIG. 8(a) is different from the first attachment portion 30 of the first embodiment shown in FIG. 3 in that the attachment portion 130 includes an insertion opening 184 on a radial side portion and a pin member 112 is inserted from the lateral insertion opening 184.

As shown in FIG. 8(a), the attachment portion 130 includes a circular arc portion 180 having a circular arc-shaped inner peripheral surface 180a, an elastic portion 134 that urges the pin member 112 toward the arc portion 180, and a support wall portion 182.

The elastic portion 134 is located between the circular arc portion 180 and the support wall portion 182, and protrudes radially inward from the inner peripheral surface 180a. The elastic portion 134 has a gap between each of the circular arc portion 180 and the support wall portion 182. The circular arc portion 180 is formed to be more easily bent than the support wall portion 182.

As shown in FIG. 8(b), the pin member 112 is inserted through the insertion opening 184, and a shaft portion 150 is held by the circular arc portion 180. The circular arc portion 180 is fitted in a first large-diameter portion 152 and a second large-diameter portion 154, and the axial movement of the pin member 112 is restricted.

Figure 9:
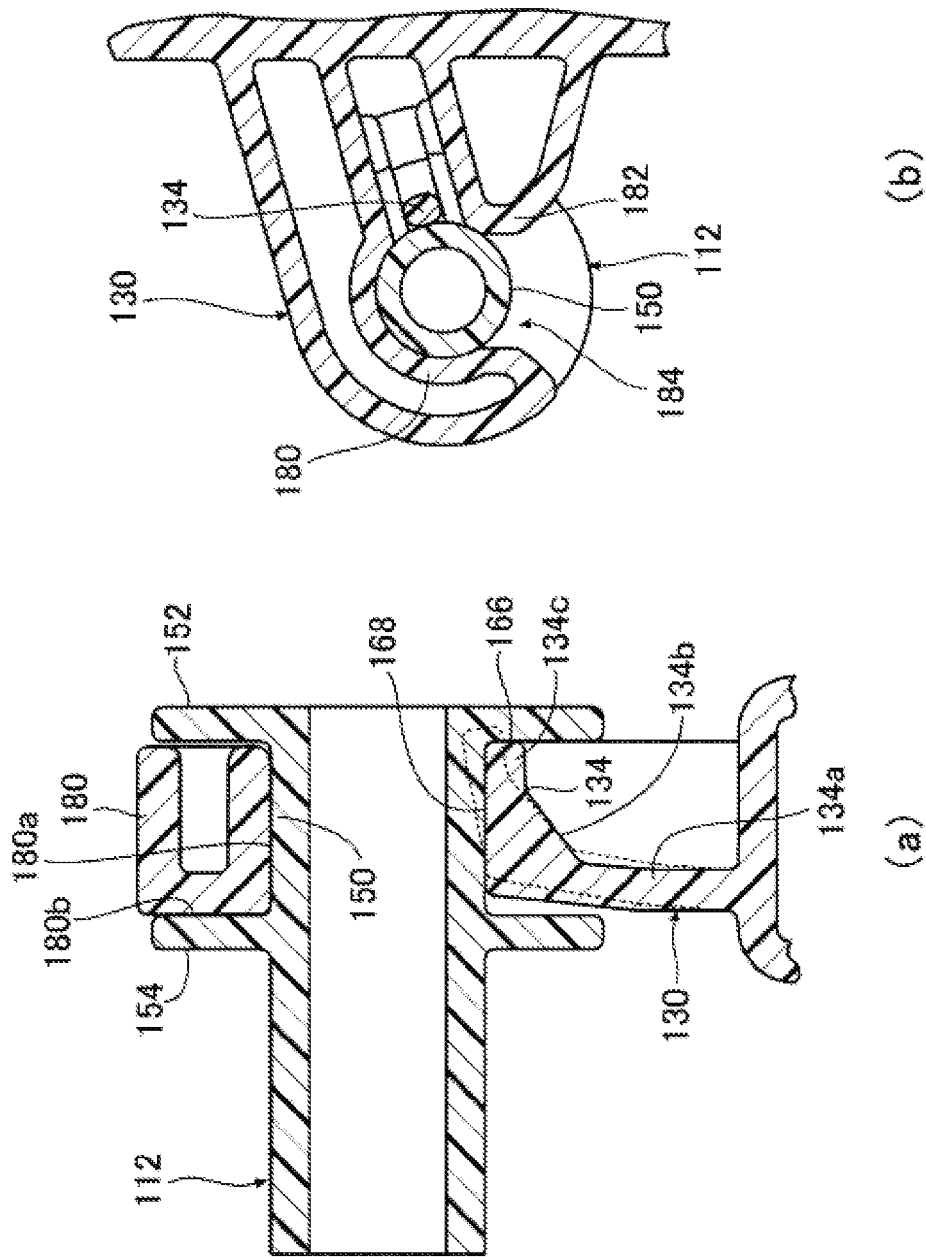
FIG. 9 is a view for explaining the attachment portion according to the second embodiment in a state in which a pin member is attached.

FIG. 9 is a view for explaining the attachment portion 130 according to the second embodiment in a state in which the pin member 112 is attached. As shown in FIG. 9(b), the circular arc portion 180 partially surrounds and holds the shaft portion 150, and the elastic portion 134 urges the shaft portion 150 to the circular arc portion 180. The circular arc portion 180 extends to a position facing the elastic portion 134 across the central axis so as to sandwich the elastic portion 134 and the shaft portion 150.

The elastic portion 134 indicated by a broken line in FIG. 9(a) is in a free state before the pin member 112 is attached, and protrudes in the axial direction from the circular arc portion 180 while protruding toward the central axis. The elastic portion 134 has a first extension portion 134a extending radially from the bottom portion 20a of the cylinder 20, a bent portion 134b bent from one end of the first extension portion 134a, and a second extension portion 134c extending in the axial direction from one end of the first extension portion 134a.

An axial abutment portion 166 located at a tip end of the elastic portion 134 abuts on the first large-diameter portion 152 to urge the pin member 112 in the axial direction. By urging the first large-diameter portion 152 in the axial direction by the elastic portion 134, the second large-diameter portion 154 is pressed against a bottom surface 180b of the circular arc portion 180. The radial abutment portion 168 located on a tip end side surface of the elastic portion 134 abuts on the shaft portion 150 to urge the pin member 112 in the radial direction. When the elastic portion 134 urges the shaft portion 150 in the radial direction, the shaft portion 150 is pressed against the inner peripheral surface 180a of the circular arc portion 180. Accordingly, it is possible to suppress rattling with the pin member 112 in the axial direction and the radial direction.

The bent portion 134b is thicker than the first extension portion 134a, and is configured to have a high rigidity in the radial direction of the elastic portion 134. Accordingly, the elastic portion 134 can firmly hold the circular arc portion 180 and the pin member 112.

The present invention is not limited to the embodiments described above, and various modifications such as design changes can be added to the embodiments based on knowledge of a person skilled in the art, and embodiments to which such modifications are added can also be included in the scope of the present invention.

INDUSTRIAL APPLICABILITY

The present invention relates to a damper device including an attachment portion through which a pin member is inserted.

REFERENCE SIGNS LIST 10 damper device
12 pin member
20 cylinder
20a bottom portion
20b opening portion
22 piston
24 cap
26 orifice forming member
26a orifice hole
28 seal ring
30 first attachment portion
31 cylinder body
32 base portion
34 elastic portion
35 wall portion
36 opening portion
40 piston body
42 rod
44 second attachment portion
46 communication hole
50 shaft portion
52 first large-diameter portion
54 second large-diameter portion
60 first extension portion
62 second extension portion
64 third extension portion
66a first axial abutment portion
66b second axial abutment portion

The invention claimed is:

1. A damper device which applies a damping force to an action of opening and closing an opening and closing body provided to a fixed body, the damper device comprising:
  a cylinder; and
  a piston which is capable of advancing and retracting in the cylinder,
  wherein the cylinder includes an attachment portion which is pivotally supported on a pin member provided to one of a fixed body and an opening and closing body, and the attachment portion includes an opening portion which penetrates in a direction substantially orthogonal to an advancing and retracting direction of the piston,
  wherein the piston includes an attachment portion which is pivotally supported on a pin member provided to another of the fixed body or the opening and closing body, and the attachment portion includes an opening portion which penetrates in the direction substantially orthogonal to the advancing and retracting direction of the piston,
  wherein the attachment portion of at least one of the cylinder and the piston includes an elastic portion which urges the inserted pin member in an axial direction and a radial direction,
  wherein the elastic portion includes
    a first extension portion which extends in the radial direction;
    a second extension portion which is bent from one end of the first extension portion and extends in a direction intersection the radial direction;
    an axial abutment portion which abuts on a large-diameter portion of the pin member protruding radially outward from an outer peripheral surface of the pin member; and
    a radial abutment portion which abuts on the outer peripheral surface of the pin member, and
  wherein the elastic portion urges the pin member in the axial direction by axially displacing one end of the first extension portion.

2. The damper device according to claim 1,
  wherein the second extension portion includes the axial abutment portion and the radial abutment portion.

3. The damper device according to claim 2,
  wherein in a state where the pin member is attached, the second extension portion fits between a pair of large-diameter portions of the pin member, both ends thereof respectively abut on the pair of large-diameter portions, and the elastic portion urges the pin member in the axial direction by axially displacing the one end of the first extension portion.

4. The damper device according to claim 2,
  wherein the first extension portion extends from one end of the second extension portion abutting on one of the large-diameter portions of the pin member, and a gap is provided between the one of the large-diameter portions of the pin member and the first extension portion.

5. The damper device according to claim 2,
  wherein the elastic portion includes a third extension portion extending in a direction intersecting with the radial direction by being bent from another end of the first extension portion and facing the second extension portion.

* * * * *